Patented June 4, 1929.

1,715,688

UNITED STATES PATENT OFFICE.

HENRY C. P. WEBER, OF EDGEWOOD, PENNSYLVANIA, ASSIGNOR TO WESTINGHOUSE ELECTRIC & MANUFACTURING COMPANY, A CORPORATION OF PENNSYLVANIA.

PHTHALIC-GLYCERIDE RESIN AND METHOD OF MAKING SAME.

No Drawing. Application filed June 10, 1925. Serial No. 36,281.

My invention relates to resinous products and specifically to a composition of resinous materials for use in molding and to a process of producing the same.

My present invention is capable of various changes and may be used to produce a variety of materials such as varnishes and molding mixtures. The resin may be utilized for preparing air-drying or baking varnishes, and for coating objects such as coils of wire. The resin itself may be used for molding purposes, either alone or in combination with other material such as mica. The resin may also be used for impregnating fillers, such as fabric, paper or comminuted material for producing composite molded products.

My invention contemplates providing a resin that is quickly and easily molded and converted into an insoluble, infusible product that is highly resistant to organic solvents and to moisture. The resin thus produced is also highly resistant to heat and possesses superior insulating properties, great mechanical strength and flexibility.

I provide a combination of resins, the components of which are naturally soluble and miscible in all proportions and which will react with each other in such manner that a greatly improved product results. I combine a furfural-phenolic condensation product and a resin made by heating or combining a polyhydric alcohol and a polybasic acid, such as glycerol and phthalic anhydrid. Both of the above named resins may exist or be prepared in at least three forms or modifications commonly known in the art as the A, B and C modifications or stages of condensation. At ordinary temperatures, the A-resin is liquid and the B- and the C-resins are solid. The C-resin is characterized in that it is infusible and insoluble, whereas the B-resin is solid and fusible and its properties are intermediate between the A- and the C-resins. Both the A- and the B-resins may be converted rapidly into the C-resin by application of heat, and may be converted into the C-resin more rapidly by pressure and a high degree of heat, the latter change being brought about, for example, when the material is molded between platens accompanied by heat and pressure.

The phenol-furfural resins are readily molded and converted into the C-stage, but are not as strong and are not as good insulators as the polybasic alcohol resins. The polybasic alcohol resins are not as easily molded as the phenol-furfural resins, but they are superior in strength and resistance to moisture. They are also superior to the phenolic resins as insulating materials and in heat-resisting properties.

I have discovered that when the above named resins are combined, a new resin is produced having properties superior to either resin alone. The new composition is similar to the phenol base resin in its molding properties, is strong and has good insulating properties. The material is highly resistant to heat and a carbonized path will not be produced when an electrical arc is drawn across the material.

The properties of my new resin probably result from a condensing action of the resins upon each other and the newly developed properties are the result of reactions between the resins themselves, since I am able to transpose my new resin into the C-modification more easily than would be expected if the composition were merely a mixture of the two resins.

I first prepare a phenol-furfural resin of the A- or the B-type using phenol, cresol or other phenolic material in a manner well known in the art, either with an acid or alkaline catalyst. If the A-modification of the resin is utilized, no solvent is ordinarily needed for combining with the other constituents. If preferred, the resin may be thinned with any of the well known solvents, such as benzene or alcohol. However, where the B-modification of the resin is used, it must be either dissolved or thinned or else finely ground in order to combine with the polyhydric alcohol resin.

The polyhydric alcohol resin is preferably prepared by combining glycerol and phthalic anhydrid in molecular proportions and heating the same to eliminate such amount of water that the A- or the B-type resin is formed.

If the A-type resins are utilized as the basic constituents, they are mixed with little or no solvent, as the two liquids readily mix. I may utilize an A-resin of one type and a B-resin of the other type, with or without a solvent, by finely grinding one of the resins. I may also utilize both resins in the B-stage of condensation and, in such case, either one or both of the resins are dissolved in a solvent and the other resin is added thereto, or I may mix the finely ground resins together and then add the thinner or solvent.

The resins may be combined by any of the above methods. I modify the speed of the reaction of the final product by utilizing resins of different stages of condensation. I may also modify the speed of the reaction of the final product by combining an A- and B-type resin. In such case, the composite resin may be cured to produce the desired degree of condensation, short of the C-stage, by heat alone. If the B-type resins are combined, I simply remove the solvent by heating either at atmospheric pressure or under reduced pressure.

When the resins are combined as a liquid, I may utilize the liquid either as a coating or as an impregnating varnish and I produce this varnish from resins which are either in the A- or the B-stage of condensation. The varnish is used for impregnating sheets of fibrous material from which molded composite articles are to be produced, or to impregnate fillers such as clay, mica or wood flour, and then ground to produce a comminuted molding mixture.

The constitutents combine with each other in all proportions and form a resin having superior insulating properties, strength and high resistance to heat. I modify the workability and the molding properties of the resin by varying the relative proportions of the constituents, and by varying the degree of condensation of the resins. In making my resin, I vary the constituents from 10 to 90% of one of the resinous materials to 90 to 10% of the other material.

In preparing a comminuted molding mixture, I dissolve, for example, 10 to 30 parts of the phenol furfural resin component in about 10 parts of alcohol or other solvent, and add 70 to 90 parts of glycerol resin component dissolved in 10 parts of alcohol and mix the two solutions. Twenty parts of filler, such as mica or wood flour are then mixed with the solution and the solvent is removed by evaporation. The composite, dried, impregnated filler is then finely ground. This composition may be converted into an insoluble infusible resin by molding with heat and pressure for a sufficient time.

Instead of simply removing the solvent and grinding, I may continue to heat the impregnated filler after removing the solvent and I then obtain a product that is intermediate between the B- and the C-stage of condensation. The latter material will still flow in the mold and is preferable for some molding purposes, as it requires only a short molding period.

Instead of mixing the solutions of resins, I may grind the solid resins and thoroughly mix the same together with or without a filler. When this mixture is subjected to heat and pressure, the two resins combine and react to form the same final insoluble product as before. The two components may also be combined by employing one of the materials in liquid condition and the other in a solid condition. In the latter case, there is a partial or a complete solution of one component in the other depending upon the amount of solid constituent used.

In preparing varnish, I combine the components preferably in the above-named proportions. I employ either or both constituents in the A or liquid stage or in the B-stage of condensation and add a solvent, such as alcohol. In case fabric, duck or other material is impregnated, the solvent is removed by evaporation and the materials molded with heat and pressure.

My invention provides a resin having extraordinary mechanical and electrical properties. The new composition is readily molded and produces an insoluble, infusible product having characteristics superior to either of the resinous materials utilized in making it.

Although I have described certain specific embodiments of my invention, I do not wish to be limited thereto, as other modifications of my invention will suggest themselves to those skilled in the art without departing from the spirit of my invention. I do not wish to be limited to the specific proportions of resins enumerated, as such proportions may be varied without departing from the spirit of my invention, the scope of which is defined in the annexed claims.

I claim as my invention:

1. A resinous composition of matter comprising a polyhydric aliphatic alcohol-polybasic carboxylic acid compound and a condensation product of a phenolic body and furfural.

2. A resinous composition of matter comprising a polyhydric aliphatic alcohol-polybasic carboxylic acid resin and a condensation product of a phenolic body and furfural.

3. A resinous composition of matter comprising a polyhydric aliphatic alcohol-polybasic carboxylic acid compound and a resin resulting from the condensation of a phenolic body and furfural.

4. A resinous composition of matter comprising a polyhydric aliphatic alcohol-polybasic carboxylic acid compound and a resin resulting from the condensation of a phenolic body and a compound of furfural containing an active furan group.

In testimony whereof, I have hereunto subscribed my name this 23rd day of May, 1925.

HENRY C. P. WEBER,